United States Patent
Bales et al.

(10) Patent No.: US 7,903,794 B1
(45) Date of Patent: Mar. 8, 2011

(54) PICTORIAL VOICE MAIL NOTIFICATION WITH LINK TO VOICE MAIL SERVER

(75) Inventors: Mark R. Bales, Kansas City, MO (US); Farni B. Weaver, Spring Hill, KS (US); Anthony J. Wageman, Lee's Summit, MO (US); Arun Santharam, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1372 days.

(21) Appl. No.: 11/398,990

(22) Filed: Apr. 5, 2006

(51) Int. Cl.
*H04M 1/64* (2006.01)

(52) U.S. Cl. ................. 379/88.11; 379/88.12; 379/88.25

(58) Field of Classification Search ............... 379/88.25, 379/88.11, 88.12
See application file for complete search history.

(56) References Cited

U.S. PATENT DOCUMENTS

| | | | |
|---|---|---|---|
| 5,251,251 A | | 10/1993 | Barber et al. |
| 5,778,053 A | * | 7/1998 | Skarbo et al. ............... 379/93.21 |
| 6,252,588 B1 | * | 6/2001 | Dawson ........................ 715/752 |
| 6,418,307 B1 | | 7/2002 | Amin |
| 6,888,927 B1 | * | 5/2005 | Cruickshank et al. ..... 379/88.11 |
| 2003/0035412 A1 | | 2/2003 | Wang et al. |
| 2004/0203608 A1 | | 10/2004 | Osann, Jr. |
| 2005/0053203 A1 | | 3/2005 | Idren |

FOREIGN PATENT DOCUMENTS

EP 1 613 045 A1 1/2006

OTHER PUBLICATIONS

U.S. Appl. No. 10/260,655, filed Sep. 30, 2002 entitled "Method and System for Providing Access to Voice Mail Messages".

* cited by examiner

*Primary Examiner* — Simon Sing

(57) ABSTRACT

An improved mechanism for voice mail notification is disclosed. When a voice mail server receives a voice mail message left by a first party for a second party, the voice mail server stores the voice mail message and generates and sends to the second party a pictorial voice mail notification message that includes (i) an image associated with the first party and (ii) a link to the stored voice mail message at the voice mail server. The pictorial voice mail notification message may be structured such that, when a user invokes the link, an active session will be established between the user's device and the voice mail server, and the voice mail server will automatically play the stored voice mail message to the user and then offer the user one or more normal voice mail management options, such as options to delete, replay, save, or forward the message.

17 Claims, 5 Drawing Sheets

PICTORIAL VOICE MAIL NOTIFICATION WITH LINK TO VOICE MAIL SERVER

FIELD OF THE INVENTION

The present invention relates to telecommunications and, more particularly, to voice mail messaging systems.

BACKGROUND

Most voice mail systems today are arranged to send notification messages to voice mail recipients, in order to notify the recipients when new voice mail messages exist. A rudimentary voice mail system, for instance, may send a notification message to a switch that serves the called party, and the switch may responsively send an alert signal to the called party's telephone to cause a voice mail alert, such as a lit LED or a voice-mail icon, to appear on the telephone. When a user receives the voice mail notification, the user may then call the voice mail system and direct the system to play out the message. Further, once connected to the voice mail system, the user may otherwise manage the user's mailbox, such as to replay, delete, or forward any stored messages.

A deficiency of such rudimentary voice mail systems, however, is that their voice mail notification messages do not provide a user with information about the voice mail message but rather provide a simple indication that a voice mail message exists. Consequently, the user may not know who left the message or when the message was left, until the user goes through the effort of calling the voice mail system.

In an effort to overcome this deficiency, methods for enhanced voice mail notification have been developed. For instance, a voice mail system may be arranged to send a voice mail notification to an e-mail address, pager, fax number, or other voice mail box, providing text data about the message, such as caller name, time of call, length of message, and the like. Further, a voice mail system may be arranged to send such an enhanced notification to the user's telephone, and the telephone may be configured to log the message and to allow the user to select the message from a display list in order to automatically retrieve the message. This latter method is described in U.S. patent application Ser. No. 10/260,655 (the '655 application), entitled "Method and System for Providing Access to Voice Mail Messages," filed Sep. 30, 2002, the entirety of which is hereby incorporated by reference. Still further, a voice mail system may be arranged to send a digitized audio recording of the voice mail message itself as an attachment to a voice mail notification, such as an e-mail attachment for instance. Upon receipt of the file, the user can then play out the audio recording without the need to connect to the voice mail system.

Unfortunately, however, even these enhanced voice mail notification systems suffer from certain deficiencies. For instance, systems that provide a user with text data regarding a message, even as in the '655 application, unfortunately require the user to go through the effort of reading the text data in order to determine whether to take the next step of connecting to voice mail system and listening to the message. Further, enhanced voice mail notification systems that send a voice mail message to a user as an audio file attachment may conveniently allow the user to play out the message locally, but such systems do not allow the user to manage the message at the voice mail server. Thus, after listening to the message locally, the user would need to then go through the effort of calling into the voice mail server in order to delete or otherwise manage the message. Consequently, an improvement is desired.

SUMMARY

The present invention provides an improved mechanism for voice mail notification. In an exemplary embodiment, when a voice mail server receives a voice mail message left by a first party for a second party, the voice mail server will store the voice mail message and will generate and send to the second party a "pictorial notification message" that includes (i) an image associated with the first party and (ii) a link to the stored voice mail message at the voice mail server. Preferably, the link will be tied to the image, so that the message recipient can click on (or otherwise select) the image in order to connect with the voice mail server and hear the message. Further, the act of clicking on the link will preferably establish a live session with the voice mail server, such that, after the voice mail server plays out the message, the voice mail server can then present the user with one or more conventional options for further interaction with the server, such as to delete, replay, save, or forward the message.

Advantageously, by having the voice mail notification provide the message recipient with an image that is associated with the party who left the message, the message recipient may not need to read any text data in order to determine who left the message and thus whether to go through the effort of connecting to the voice mail server and listening to the message. The image may, for instance, be a photographic image of the party who left the message, and may thereby convey at a glance who left the message. Alternatively, the image may be any other image deemed to be associated with the party who left the message, regardless of whether the image actually depicts the party.

In addition to including the image and the link, the pictorial notification message of the present invention will preferably carry an identifier of the voice mail message, such as an identifier assigned by the voice mail server to point to the stored message. In a preferred embodiment, invocation of the link may then cause that identifier to be provided to the voice mail server, so that the voice mail server can retrieve and play out the appropriate voice mail message. For instance, invocation of the link may initiate Session Initiation Protocol (SIP) signaling with the voice mail server in order to set up a packet-based real-time media session through which the voice mail server may play out the message to the recipient, and the SIP signaling may carry the message-ID to the voice mail server.

The pictorial notification message may be sent to the second party in various ways. In a preferred embodiment, for instance, assuming the recipient device is a cellular telephone, the pictorial notification message may be sent via Multimedia Messaging Service (MMS) or Wireless Application Protocol (WAP) push messaging, in a manner well known in the art. The recipient device may then present the pictorial notification image, including at least the image associated with the first party, and the recipient user may conveniently decide to invoke the link in order to connect with the voice mail server and hear/manage the message.

In an exemplary embodiment, the invention can take the form of a method for carrying out the functions described above, including sending a pictorial voice mail notification message when a first party leaves a voice mail message for a second party. In another embodiment, the invention can take the form of a voice mail server, comprising data storage, a processing unit, image data, message storage logic, and pictorial notification logic, which may be stored in the data storage or provided in some other manner.

The image data includes (i) multiple digital images and (b) correlation-data that correlates each of a set of parties respectively with a given one of the digital images. The message storage logic is executable by the processing unit to receive and store voice mail messages left for parties. And the pictorial notification logic is executable by the processing unit, upon receipt of a voice mail message left by a first party for a second party, (a) to reference the correlation data so as to determine a given image correlated with the first party, and (b) to generate and send to the second party a pictorial notification message that includes (i) the given image and (ii) a link to the voice mail message, such that invocation of the link will cause the voice mail server to play out the voice mail message and will preferably cause initiation of a live session with the voice mail platform.

These and other aspects, advantages, and alternatives will become more readily apparent to those of ordinary skill in the art by reading the following detailed description, with reference where appropriate to the accompanying drawings.

DETAILED DESCRIPTION

Figure 1:
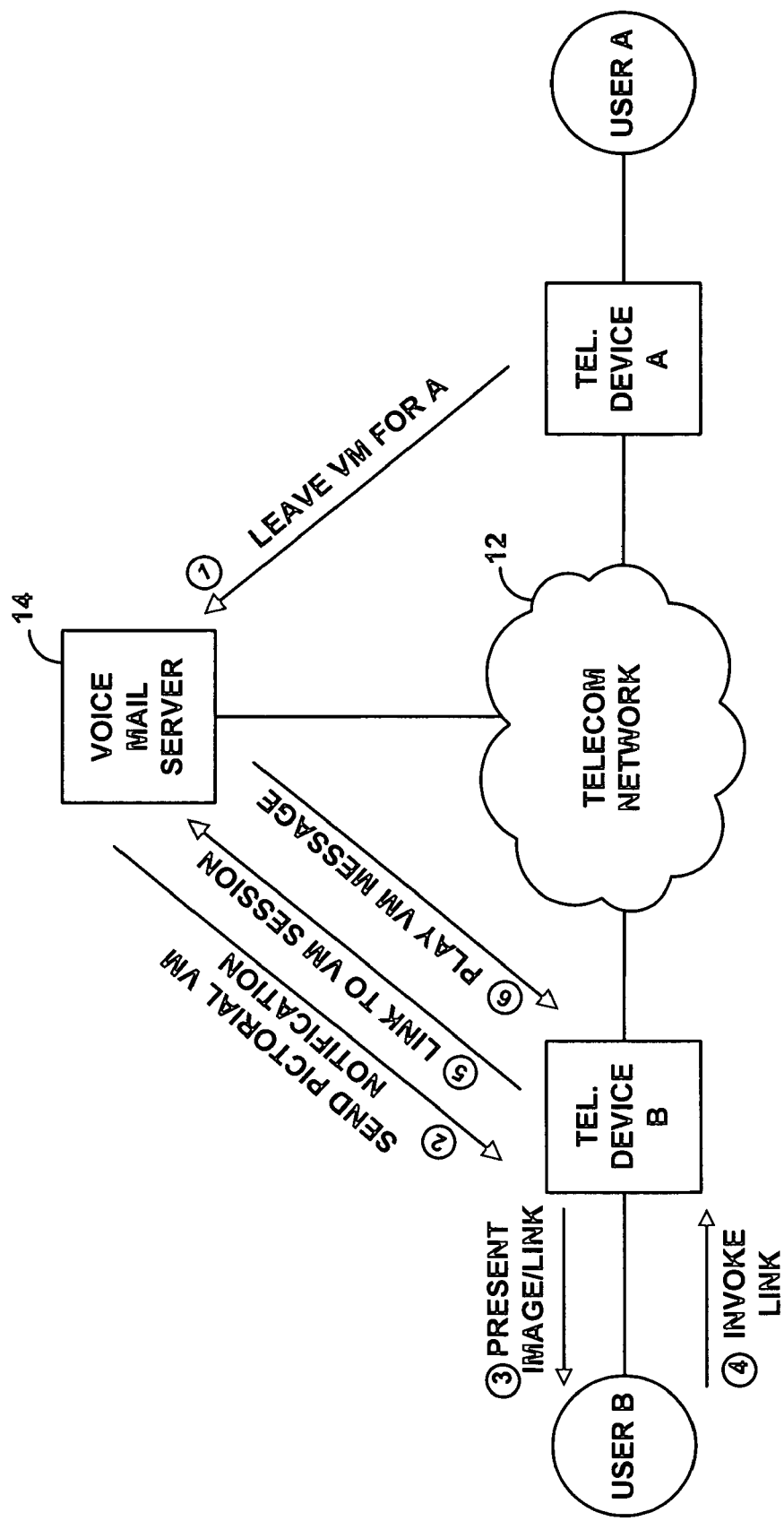
FIG. 1 is a simplified block diagram of a telecommunication system in which an exemplary embodiment of the invention can be implemented.

Referring to the drawings, FIG. 1 is a simplified block diagram of a system depicting basic operation of the invention. As shown, the exemplary system includes at its core a telecommunications network 12, which provides connectivity between a plurality of telephone devices A, B and a voice mail server 14. Telephone device A is operated by user A, and telephone device B is operated by user B.

In practice, the process may begin when user A leaves a voice mail message for user B, as shown at step 1. For instance, user A may attempt to call user B and, if user B's line is busy, may be connected with the voice mail server, which may then prompt user A to leave a voice mail message. The voice mail server may then record user A's voice mail message in data storage for later retrieval by user B.

As shown next at step 2, in response to receiving the voice mail message from user A, the voice mail server then sends a pictorial voice mail notification message to device B, providing an image associated with user A and a link to the stored voice mail message at the server. At step 3, device B then presents the pictorial voice mail notification to user B, in particular presenting the image with the link available for invocation by user B. At step 4, after conveniently viewing the image and possibly determining from the image that the message is from user A, user B invokes the link in order to connect with the voice mail server and hear user A's message. Thus at step 5, in response to invocation of the link by user B, device B signals to the voice mail server to establish a communication session and to cause the voice mail server to play out the message. And at step 6, the voice mail server plays out the message. Preferably after playing out the message, the voice mail server then presents user B with conventional message-handling options, such options to replay, delete, save, or forward the message.

The arrangement shown in FIG. 1 is meant to generally depict operation of the invention, although variations from the arrangement shown are also possible. Within the general construct of FIG. 1, it should be understood that the telephone devices can take any of a variety of forms, and the devices may engage in communication in any of a variety of ways, such as through wireless, landline, circuit-switched and/or packet-switched communication for instance. Further, the telecommunications network 12 and various links shown in the figure can take any of a variety of forms and may be a combination of multiple networks, links, and/or other systems. Still further, voice mail server 14 may also take various forms and may be a combination of multiple elements generally constituting a server, platform, or system.

More generally, it should be understood that this and other arrangements and processes described herein (including in the foregoing summary section) are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

In order to explain more specifically how the invention can be carried out in practice, the remainder of this description will focus on a particular embodiment of the invention, where the two telephone devices are cellular wireless communication devices each served by a common wireless carrier and operating in a common serving system, and where the voice mail server is hosted by that wireless carrier. This embodiment is intended merely to illustrate the invention by way of example and is not intended to limit the scope of the invention as generally described above or as recited in the claims.

Figure 2:
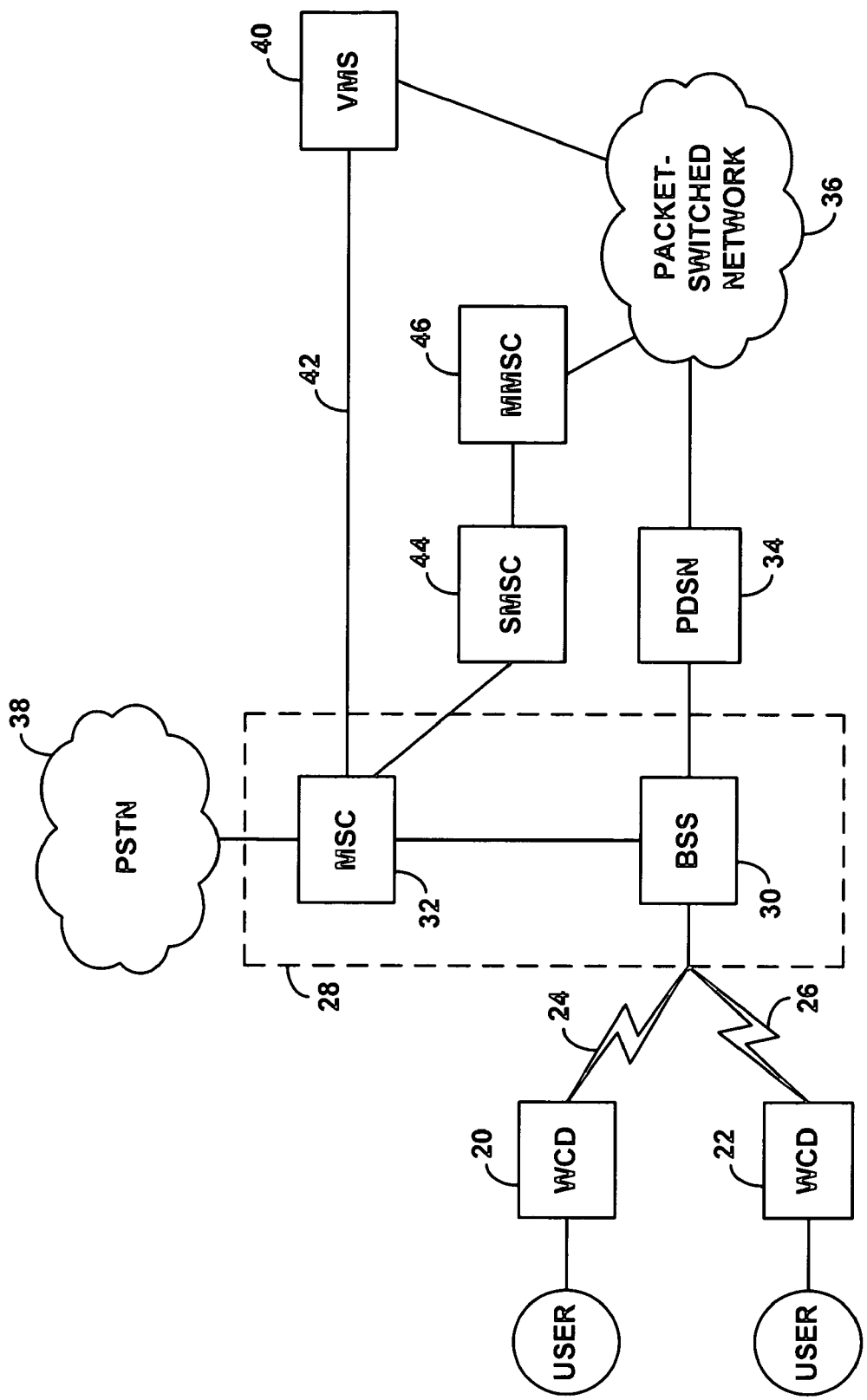
FIG. 2 is another simplified block diagram of a telecommunication system in which the exemplary embodiment can be implemented.

FIG. 2 depicts the exemplary arrangement. As shown in FIG. 2, two wireless communication devices (WCDs) 20, 22 are in communication via respective air interfaces 24, 26 with a wireless serving network 28 operated by a wireless carrier. The carrier's wireless serving network 28 includes a base station system (BSS) 30 and a mobile switching center (MSC) 32.

BSS 30, in turn, typically includes one or more base transceiver stations (BTSs) arranged to engage in air interface communication with WCDs according to a designated air interface protocol, such as code division multiple access (CDMA), global system for mobile communication (GSM), or time division multiple access (TDMA). Further, BSS 30 typically includes a base station controller (BSC) or radio network controller (RNC), which controls air interface operation, including handoff between BTS coverage areas. The BSC/RNC also provides connectivity with a gateway, such as a packet data serving node (PDSN) 34, to a packet-switched network 36. Network 36 can be one or more private and/or public packet networks, such as a carrier's core transport network and/or the public Internet.

MSC 32, in turn, controls BSS 30, and MSC 32 functions as a switch to provide connectivity with other switches (not shown) on the public switched telephone network (PSTN) 38. Alternatively or additionally, the MSC function may be implemented by a media gateway and media gateway controller on packet-switched network 36, to facilitate packet-based telephone communications.

Through this basic arrangement, a suitably equipped WCD such as WCD 20 or 22 can engage in circuit-switched communications and/or packet-based communications.

For instance, to place a circuit-switched telephone call, the WCD may send an origination request message over an air interface access channel to the wireless serving network 28, which BSS 30 would pass along to MSC 32. MSC 32 would then read a dialed telephone number from the origination request message and engage in call setup signaling to set up the call with the called party. Further, MSC 32 would direct BSS to assign an air interface traffic channel through which the WCD can engage in the call. Similarly, when MSC 32 receives a request to connect a call to a WCD, MSC 32 may direct BSS 30 to page the WCD over an air interface paging channel and to assign an air interface traffic channel for the call, and when the WCD answers the call, MSC 32 may connect the call through to the WCD.

To engage in packet-based communications, on the other hand, a WCD may first acquire packet-data connectivity by sending a packet-data origination request message over an air interface access channel to the wireless serving network 28, which BSS 30 may similarly pass along to MSC 32. In this case, MSC 32 may then direct BSS 30 to assign an air interface traffic channel, thus establishing a physical radio link layer connection for data communication by the WCD. Further, BSS 30 would signal to PDSN 34, which would then engage in negotiations with the WCD to establish a data link layer connection, such as a point to point protocol (PPP) connection. In addition, either PDSN 34 or a Mobile-IP home agent (not shown) would then assign an IP address to the WCD, which the WCD may then use to engage in packet-based communications with other entities on network 36.

Once the WCD has an IP address and radio and data link layer connections, the WCD can send and receive packet data. In order to conserve air interface resources, however, the WCD's radio link may be released after a certain period during which no packet data flow to/from the WCD. In the resulting dormant state, the WCD may still have its IP address and data link. However, to send or receive data, the WCD would need to re-acquire its radio link and thus transition from a dormant state to an active state. When a dormant WCD has packet data to send, the WCD may send a new packet-data origination request to the BSS 30, and the BSS 30 would re-assign a radio link over which the WCD can send the data. Similarly, when data arrives at BSS 30 destined to the WCD, the BSS 30 may page the WCD and may re-assign a radio link over which the BSS may send the data to the WCD.

The arrangement of FIG. 2 further includes a voice mail server (VMS) 40, which is arranged to implement the pictorial voice mail notification functions of the invention. VMS 40 is coupled with MSC 32 through a communication link 42, such as a voice trunk. For instance, VMS 40 may be implemented as logic on a service node (SN), and MSC 32 may be connected by a voice trunk to the service node and thus to the VMS. With this arrangement, a WCD can communicate with the VMS 40, via BSS 30, MSC 32, and link 42. For instance, a WCD may place a call to the VMS 40, via MSC 32, in order to leave a voice mail message or to manage voice mail messages. Although not shown, other telephone devices on PSTN 38 may similarly be connected via MSC 32 to the VMS 40, such as when a called WCD's line is busy.

In addition, VMS 40 preferably sits as a node on packet-switched network 36, so that the VMS 40 can engage in packet-data communications. With this arrangement, a WCD can engage in packet-data communication with the VMS 40.

For example, instead of establishing a circuit-switched telephone call between the WCD and the VMS 40, a packet-switched call (e.g., a Voice over IP (VoIP) call) can be established between the WCD and the VMS 40, via BSS 30, PDSN 34, and network 36 (or perhaps through MSC as a media gateway). Further, as another example, the VMS can use its packet-network connection as a way to send a pictorial voice mail notification to a WCD.

Also shown as part of the communication system of FIG. 2 are a Short Messaging Service Center (SMSC) 44 and a Multimedia Messaging Service Center (MMSC) 46, each of which functions to relay messages to WCDs. Although SMSC 44 and MMSC 46 are shown as separate entities, they could be combined together as functions of a common messaging platform. As illustrated, SMSC 44 is coupled with MSC 32, typically by a signal transfer point (STP) (not shown) that supports signaling according to various industry standard protocols such as EIA/TIA IS-41 and EIA/TIA IS-637. Further, MMSC 46 is coupled with SMSC 44, also perhaps via an STP. MMSC 46 is further shown sitting as a node on packet-switched network 36, so that MMSC 46 can engage in packet-data communications.

SMSC 44 generally functions to store and forward short messaging system (SMS) messages, as defined by IS-637 for instance. Generally, SMSC 44 receives an SMS message destined to a particular WCD (identified by mobile identification number (MIN) for instance) and then forwards the SMS message to the MSC serving the WCD, which in turn forwards the message over the air to the WCD. If the WCD is inaccessible at the time the SMSC 44 is seeking to deliver a message to the WCD, the SMSC 44 may store the message until a later time when the WCD becomes accessible.

SMS messaging is most commonly used to convey short text messages to WCDs, but SMS messaging can also be used for other purposes as well, typically by conveying specially coded SMS messages that cause message-handling logic in a recipient WCD to perform one or more designated functions. For example, SMS messaging can be used to facilitate "pushing" of media content, such as markup documents, images, and/or audio, to a WCD.

In general, to push media content to a WCD using SMS messaging, a network server may store the media content at a particular URL location on a packet-data network and may then send to the WCD an SMS message that designates the URL and is specially coded to cause the WCD to download the content from that URL. This process is sometimes referred to as WAP Push (Wireless Application Protocol Push), as it may use the well known Wireless Application Protocol for data communication with the MS. Further, the process has been adapted in recent years to define the now well-known MMS protocol.

MMS messaging is designed specifically to facilitate delivery of multimedia content to a WCD in a manner that takes much of the burden off of the sending entity. To send media content to a WCD using MMS messaging, a server or other message-sender delivers to an MMSC, such as MMSC 46, an MMS message file that contains an MMS header followed by a multipart binary MIME message defining the media-content (such as one or more images, audio files, or the like). The MMSC then stores the media content and transmits a subset of the MMS header as an MMS notification message (MMS message type "m-notification-ind") via SMS to the WCD, together with a URL pointer to a location of the stored message-content. Upon receipt of the MMS notification message, program logic on the WCD then automatically (or with user consent) sends an HTTP request to download the message from the designated URL, thus completing delivery of the message-content to the WCD. The MMS messaging process may take other forms as well.

VMS 40 generally functions to receive, store, and play out voice mail messages for subscribers such as WCDs 20, 22. As such, VMS 40 defines in data storage at least one voice mail box for each subscriber. In connection with each voice mail box, VMS 40 further defines in data storage an outgoing audio greeting that the VMS 40 plays to a caller as a prompt for the caller to leave a message for the subscriber. VMS 40 may then receive a voice mail message spoken by the caller and may record the voice mail message in data storage as a message in the subscriber's voice mail box. According to the present invention, VMS 40 will then generate and send a pictorial voice mail notification message to the subscriber.

Figure 3:
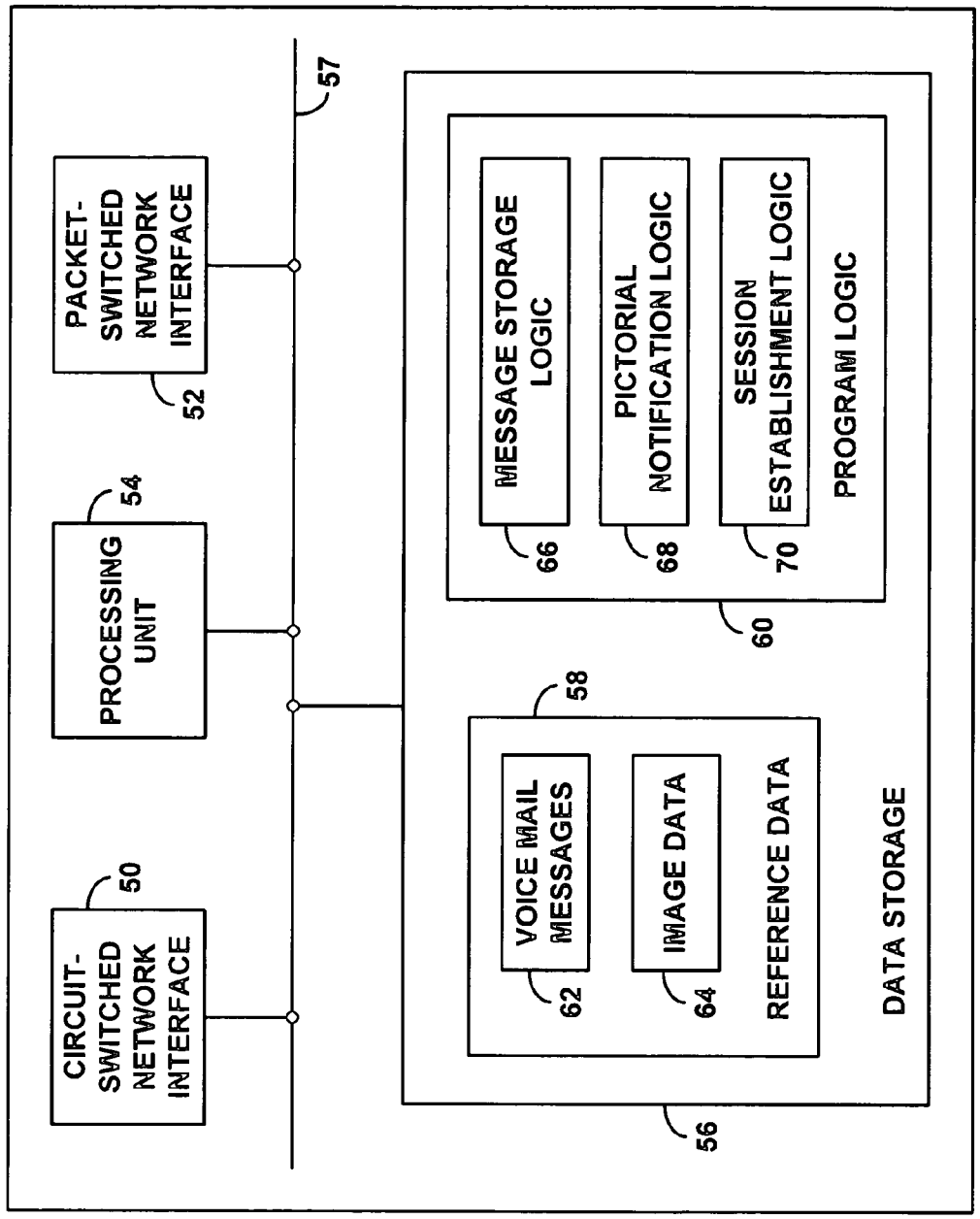
FIG. 3 is a simplified block diagram of a voice mail server operable in the exemplary embodiment.

FIG. 3 is a simplified block diagram depicting components of an exemplary VMS arranged to implement the invention. As shown, the VMS includes a circuit-switched network interface 50, a packet-switched network interface 52, a processing unit 54, and data storage 56, all of which may be coupled together by a system bus, network, or other mechanism 57.

The circuit-switched network interface 50 allows the VMS to connect to circuit-switched networks such as the PSTN 38 and, particularly, a voice trunk extending to MSC 32. The other packet-switched network interface 52 allows the VMS to connect to packet-switched networks, such as network 36. Both the circuit-switched network interface 50 and the packet-switched network interface 52 may operate bi-directionally in order to receive messages into the VMS and send messages out of the VMS. For instance, either or both interfaces may function to receive voice mail messages left for subscribers, to send pictorial voice mail notifications to subscribers, and to play out voice mail messages to subscribers.

Processing unit 54 comprises one or more general purpose processors (e.g., INTEL processors) and/or one or more special-purpose processors (e.g., digital signal processors, application specific integrated circuits, etc.) operable to carry out functions of the invention. Alternatively or additionally some or all of the functions may be carried out by suitably configured hardware or a combination of hardware, firmware, and/or software.

Data storage 56 comprises one or more storage components, such as magnetic, optical, or organic storage, and may be integrated in whole or in part with processing unit 54. As shown, data storage 56 may contain or be arranged to contain both reference data 58 and program logic 60. The reference data 58 includes data that defines a voice mail box for each voice mail subscriber and may be structured in a relational database format or in some other format.

For each mail box, the reference data 58 includes (i) a recorded greeting (not shown) that the VMS can play to callers, (ii) one or more recorded voice mail messages 62 left for the subscriber, and (iii) image data 64 for use in pictorial voice mail notifications. Further, each recorded voice mail message has a respective message-ID that allows the VMS to uniquely identify the message, and the reference data 58 preferably correlates each stored message with its message-ID.

The image data 64 may include (i) a plurality of digital images and (ii) correlation data that correlates each of a plurality of parties respectively with a given one of the digital images. The image data can correlate a given image with just one party or with multiple parties (e.g., those in a defined group, such as family members) if desired. Similarly, the image data can correlate a given party with just one image or with multiple images if desired, and can define selection-data specifying which of the images is to be used in pictorial voice mail notification, depending on factors such as time of day, urgency of message, calling party number/line (e.g., depending on what phone the caller uses to connect to the VMS), or the like. In an alternative embodiment, image data may be provided more generally without being tied to particular voice mail boxes. Thus, the VMS could use the image data for pictorial voice mail notifications regardless of the subscriber at issue.

The image data can be provisioned in various ways. In one arrangement, the subscriber can provision image data for his or her own voice mail box through a web-based interface provided by the VMS. For instance, the subscriber may upload images through that interface and direct the VMS to associate (correlate) the images with particular parties, identifying each party by telephone number, SIP address, or the like. Thus, the VMS may receive the images from the subscriber and may store the images in image data 64 together with database associations between the images and the parties as indicated by the subscriber. In another arrangement, the VMS may receive images from the parties with whom the images will be associated.

As noted above, the digital images may be images of the parties with whom they are associated, such as photographic images of the parties. Alternatively, the images may be other images associated with the parties. For instance, a corporate logo could be the image associated with a party who is an executive or employee of a particular company. Whether a person will understand a particular image to signify a particular party, and thus whether a person will think of that party when faced with the image that image data 64 associates with that party is a matter of subjective judgment. The important point is that image data 64, or more generally VMS 40, associates the image with the party.

The digital images may be digitally structured in any form now known or later developed. For instance, the images may be jpeg, bmp, png, or tiff images. Further, image data 64 could contain a given image in various forms, to facilitate delivery of the image in an appropriate form depending on capabilities of the receiving device. (In practice VMS could dip into a device-capabilities store, such as a CC/PP database, to determine which form image to send in a pictorial voice mail notification to a particular subscriber and may then use send that form of the image.)

Program logic 60 include machine language instructions or other program instructions executable by processing unit 54 to carry out basic voice mail services and further to carry out the pictorial voice mail notification and playout functions of the present invention. As such, program instructions 60 preferably define (i) message storage logic 66, (ii) pictorial notification logic 68, and (iii) session establishment logic 70 such as a SIP client and an RTP client for instance.

Message storage logic 66 is executable by processing unit 54 to receive and store voice mail messages left for subscribers. As noted above, VMS 40 may receive voice mail messages left by callers via circuit-switched network interface 50 or packet-switched network interface 52. Pursuant to message storage logic 66, VMS 40 may play out a greeting to a caller and may then receive the caller's message to a subscriber and store the message as a digital audio file in the subscriber's voice mail box within digital data storage 56. Alternatively, VMS 40 may receive a voice mail message left for a subscriber by receiving a user-directive to forward a previously recorded voice mail message to the subscriber's voice mail box, in which case the VMS may store a new copy of the message, or (just the same) a pointer to the previously recorded message, in the subscriber's voice mail box. Still alternatively, VMS 40 may receive and store a reply voice mail message left for a subscriber, or VMS 40 may receive and store a voice mail message conveyed by some external mechanism such as SMTP. Other examples of receiving and storing voice mail messages are possible as well. When the VMS receives and stores a voice mail message, the message-storage logic 66 will cause the VMS to assign a message-ID to the message and to store an association between the assigned message-ID and the stored message.

In accordance with the invention, the pictorial notification logic 68 is executable by the processing unit 54, upon receipt of a voice mail message left for a subscriber, to generate and send a pictorial notification message to the subscriber.

In an exemplary embodiment, when the VMS 40 receives a voice mail message left by a caller for a subscriber, the VMS 40 will responsively reference the correlation data of image data 64, in order to identify an image associated with the calling party. (The VMS 40 may first query a profile store to establish that the subscriber subscribes to the pictorial notification service and/or may apply other conditions to carrying out this process). For instance, the VMS 40 may query the correlation data based on the calling party's telephone number of the calling party and may thereby determine an image associated with that calling party.

In an alternative embodiment, the calling party may provide the image to the VMS 40 in real time at the time the calling party communicates with the VMS 40. For instance, if the calling party is communicating with the VMS 40 through a packet-data connection, the calling party may send the image to the VMS 40 as additional packet-data in its session with the VMS. Alternatively, the calling party may have an additional data session in parallel, through which the calling party conveys the image to the VMS 40.

Given the image associated with the calling party, the VMS 40 then generates a pictorial voice mail notification message that includes that image and a link that, when invoked, will establish a connection with the VMS 40 and cause the VMS 40 to play out the voice mail message.

In the exemplary embodiment, the pictorial voice mail notification message may comprise a markup document, such as an HTML or HDML document. Such a markup document can carry a binary copy of the image through well known multipart MIME formatting. Alternatively, the markup document can include the image by including a tag that points to the image at the VMS, thus incorporating the image by reference as part of the document (and causing a recipient device to download and render the image when rendering the document). For instance, assuming the image is stored at the URL "voicemailserver/selected-image.gif" (or a more full URL), the markup document could include the image with the language: <IMG SRC="voicemailserver/selected-image.gif">, so that a recipient device rendering the markup document would download and display the "selected-image.gif" image.

The markup document can then carry the link to the stored voice mail message in various ways as well, preferably identifying the message by its assigned message-ID. In a simplified embodiment, the link may be a link to the audio content of the message itself, such that user-invocation of the link will cause a media player application on the recipient device to receive and play out a streaming audio version of the voice mail message directly from the VMS 40. For instance, if the voice mail message is stored as a Real Media audio file at the URL "voicemailserver/message-ID.rm" (or a more full URL), the markup document can carry a link to the message by including the language: <A HREF="voicemailserver/message-ID.rm><A>. When a user invokes such a link, the user's device would execute a REALPLAYER application, which would engage in a streaming media session with the VMS to play out the message from that URL.

In a more preferred embodiment, however, the markup document will include the link to the stored voice mail message in a way that will cause the recipient device to establish an active session with the voice mail server when a user clicks on the link, such that the VMS will play out the voice mail message and will then offer the user one or more VMS-interaction options (e.g., save, delete, forward, or replay).

To do this in an exemplary embodiment, the markup document may include a SIP link that causes the recipient device (i) to engage in SIP signaling to set up an RTP session with the VMS and (ii) through the SIP signaling, to direct the VMS to play out the message at issue. One way to structure markup to facilitate this is as follows: <A HREF="sip:play@voicemailserver.com//message-ID=12345"><A> (where "12345" is an example message-ID).

When a user invokes this SIP link, the user's device may automatically execute SIP client logic that would responsively construct and send a SIP INVITE message to a SIP URI that will initiate a connection with the voice mail server and playout of the message. For instance, the SIP client logic may construct and send a SIP INVITE message to the SIP URI "sip: 9876543210@voicemailserver.com; message-ID=12345; mode='play'" (where "9876543210" is the subscriber's phone number or other identifier of the voice mail account being accessed, "12345" is the example message-ID, and "play" indicates a directive for VMS 40 to play the indicated voice mail message).

The VMS 40 would receive the SIP INVITE and would thus receive the message-ID. In response, the session establishment logic 70 (e.g., a SIP client) at the VMS 40 would then complete SIP signaling with the user's device (sending a SIP 200 OK acceptance message, and then receiving a SIP ACK message), so as to establish an RTP session between the user's device and the VMS. And, using the message-ID provided by the INVITE message, the VMS 40 would retrieve the voice mail message from data storage and would play it out to the user's device, in much the same way that the VMS 40 would play out a message to a subscriber when the subscriber conventionally calls the VMS 40 to check messages. Thus, after playing the message to the user, the VMS 40 may present its usual options to the user to enable the user to manage the messages or the user's mailbox generally.

Preferably, the VMS 40 will structure the pictorial voice mail notification message to tie the message-link to the image, so that a user can invoke the link by clicking on (or otherwise selecting) the image. To do this, the VMS 40 may structure the markup document to recite the HREF for the link before the image and to close up the link after the image. For instance, with the image link and SIP link as described above, the markup document could be structured to recite: <A HREF="sip:play@voicemailserver.com//message-ID=12345"><IMG SRC="voicemailserver/selected-image.gif"><A>.

The pictorial voice mail notification message may also include text that the recipient device would display, directing the recipient user to click on the image or to otherwise invoke the link so as to connect with the VMS 40 and hear the message. Further, the pictorial voice mail notification message may also include additional information, such as a text indication of the calling party number, calling party name, time of call, or the like. However, an advantage of the invention is that the image provided to the recipient user is one associated with the calling party, so the recipient user may be able to quickly determine at a glance who left the message, without needing to read any text to make that determination.

Once VMS 40 generates the pictorial voice mail notification, VMS 40 then sends the pictorial voice mail notification message to the subscriber for whom the message was left. The VMS 40 may do this in various ways, depending on the form of the message and depending on other factors, such as recipient device type for instance. In a preferred embodiment, where the recipient device is a WCD, the VMS 40 will send the pictorial voice mail notification message to the WCD through WAP Push or more specifically through MMS messaging.

To send the pictorial voice mail notification message through WAP Push, the VMS 40 may store the pictorial voice mail notification message (e.g., markup document) at a URL and may generate and send to the WCD a specially coded SMS message designating that URL. The SMS message would thus pass to SMSC 44 (via an STP link, not shown) and via wireless serving network 28, to the WCD. Upon receipt of the SMS message, a message-handler application on the WCD would then detect that it is coded as a WAP Push message and would responsively (possibly with user approval) send an HTTP request to download the pictorial notification message from the designated URL, after first acquiring wireless data connectivity if it does not currently have it or if it is dormant.

To send the pictorial voice mail notification message through MMS messaging, the VMS 40 may send the pictorial voice mail notification message (e.g., markup document) in an MMS message to MMSC 46. MMSC 46 would then store the pictorial voice mail notification message at a URL and may generate and send to the WCD an MMS notification message designating that URL. The MMS notification message would thus pass to SMSC 44 and via wireless serving network 28 to the WCD. Upon receipt of the MMS message, a message-handler application on the WCD would then responsively (possibly with user approval) send an HTTP request to download the pictorial notification message from the designated URL, after first acquiring wireless data connectivity if it does not currently have it or if it is dormant.

Figure 4:
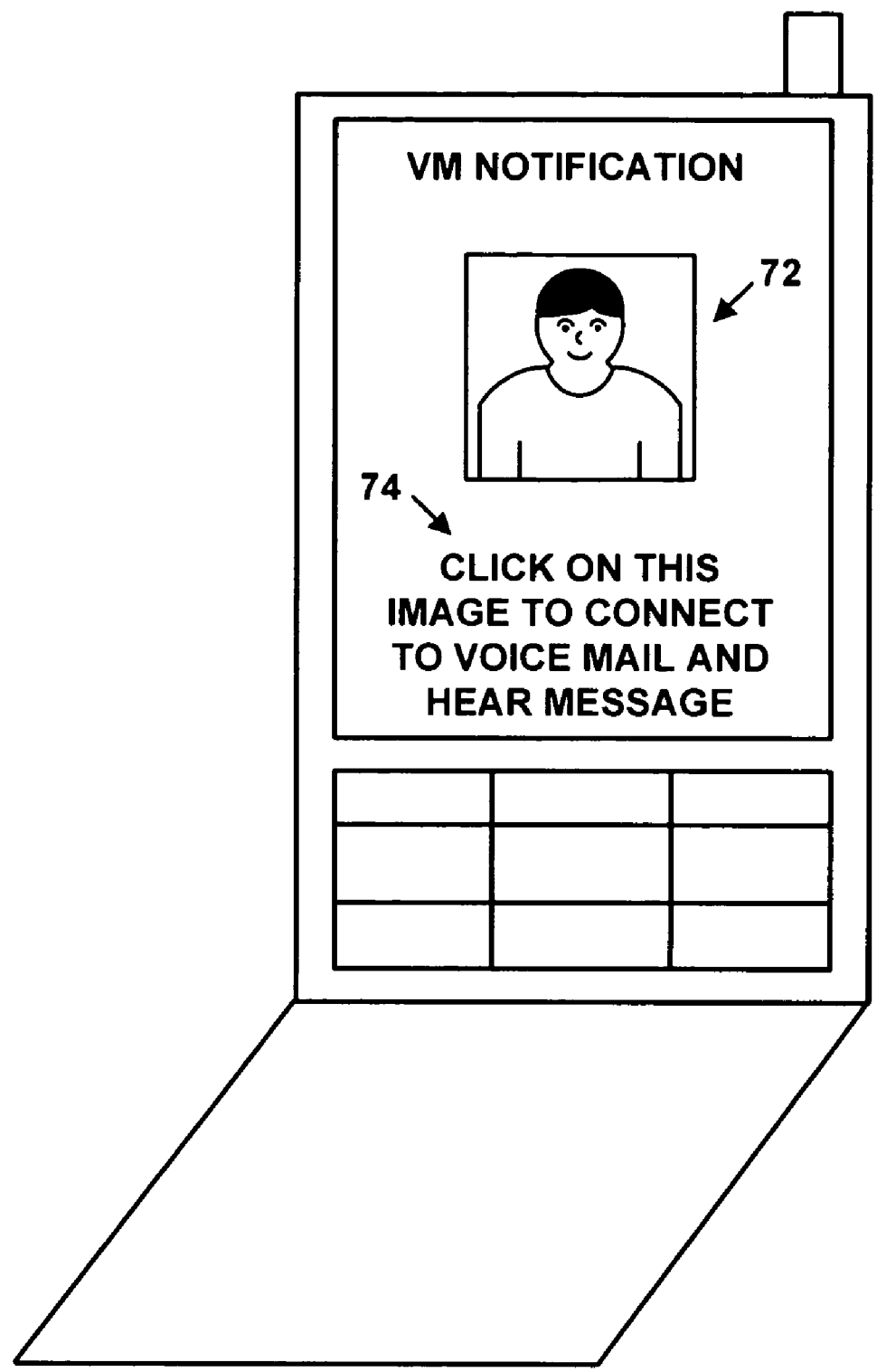
FIG. 4 is a front view of a WCD presenting a pictorial voice mail notification message.

FIG. 4 is an example front view of a WCD, showing how a pictorial voice mail notification message may look when rendered by a browser on the WCD and thus when presented to a user. As shown in FIG. 4, the WCD display shows an image 72, which is an image that VMS 40 determined to be associated with the party who left the voice mail message. Further, the display shows under the image a set of text 74 that directs the user to click on the image in order to connect with the VMS 40. When the user clicks on the image, the user's device would thus establish a connection with the VMS 40 and the voice mail message would be played out for the user to hear.

Figure 5:
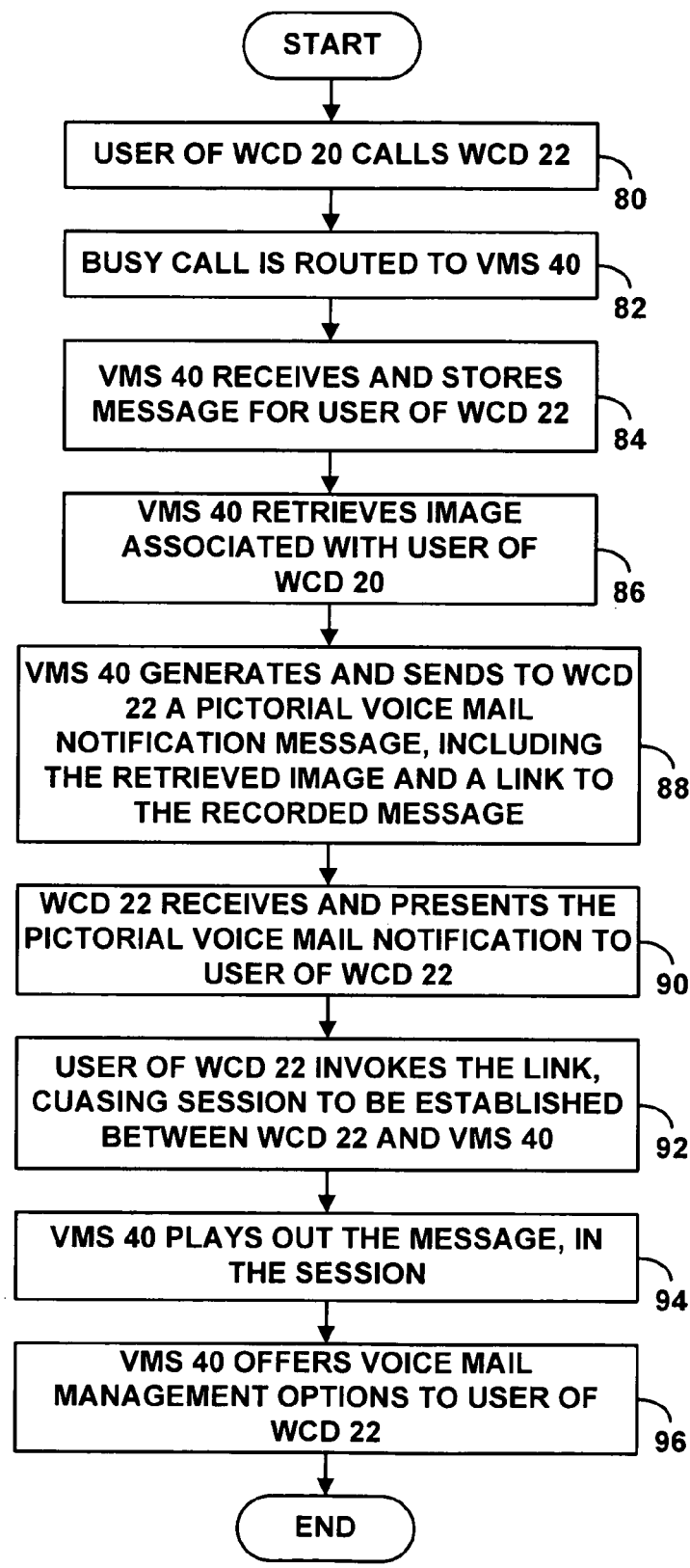
FIG. 5 is a flow chart depicting functions carried out in accordance with the exemplary embodiment.

Finally, FIG. 5 is a flow chart depicting functions carried out in accordance with the exemplary embodiment, in the arrangement of FIG. 2. As shown in FIG. 5, at step 80, the user of WCD 20 calls WCD 22. Assuming the user of WCD 22 is on the phone at the time and does not take the call, at step 82, the call from WCD 20 would be connected to VMS 40. At step 84, VMS 40 would then receive and store a voice mail message from the user of WCD 20 for the user of WCD 22. At step 86, VMS 40 would then retrieve from data storage an image associated with the user of WCD 20. And at step 88, VMS 40 would generate and send to WCD 22 a pictorial voice mail notification message, including the retrieved image and a link to the recorded voice mail message. At step 90, WCD 22 then receives and presents the pictorial voice mail notification to the user of WCD 22. And at step 92, after the user sees the image and thereby conveniently determines who left the message, the user invokes the link, causing a session to be established between WCD 22 and VMS 40. At step 94, VMS 40 then plays out the message in the session. And at step 96, VMS 42 offers the user of WCD 22 normal voice mail management options, such as the options to save, delete, forward, or replay the message.

An exemplary embodiment of the present invention has been described above. Those skilled in the art will understand, however, that changes and modifications may be made to this embodiment without departing from the true scope and spirit of the present invention, which is defined by the claims.

For example, although the foregoing mainly describes the "image" in a pictorial voice mail notification message as being a still image, it should be understood that the image could just as well be a moving image, e.g., a video. Thus, VMS 40 could retrieve from data storage (or otherwise obtain) a digitized video associated with the party who left the voice mail message and could establish and send a pictorial voice mail notification message that carries that digitized video and a link for connecting to the voice mail server as discussed above.

Other variations or extensions are possible as well.

We claim:

1. A method comprising:

a voice mail platform receiving from a first party in a first session between the first party and the voice mail platform a voice mail message from the first party for a second party, the voice mail message defining audio content;

the voice mail platform receiving from the first party in a second session between the first party and the voice mail platform, at the time of the first session, an image associated with the first party; and response to receiving the voice mail message, the voice mail platform storing the audio content at the voice mail platform and sending over a network from the voice mail platform to the second party a pictorial notification message that includes (i) the received image associated with the first party and (ii) a link to the stored audio content, wherein invocation of the link causes the voice mail platform to play out the stored audio content.

2. The method of claim 1, wherein invocation of the link causes a third session to be initiated with the voice mail platform, in which the voice mail platform plays out the audio content and then offers one or more options for further interaction with the voice mail platform.

3. The method of claim 2, wherein the one or more options include at least one option selected from the group consisting of delete, save, replay, and forward.

4. The method of claim 2, wherein the one or more options comprise options that the voice mail platform normally presents to a user after voice mail message playout.

5. The method of claim 2, wherein the pictorial notification message further includes an identifier of the voice mail message, and wherein invocation of the link causes the identifier to be provided to the voice mail platform.

6. The method of claim 5, wherein invocation of the link causes a Session Initiation Protocol (SIP) INVITE message to be sent to the voice mail platform, seeking setup of the third session, wherein the INVITE message carries the identifier.

7. The method of claim 5, further comprising:

at the voice mail platform, receiving the INVITE message, engaging in further signaling to establish the third session, and playing out the audio content in the third session.

8. The method of claim 7, further comprising:
at the voice mail platform, after playing out the audio content in the third session, offering the one or more options for further interaction with the voice mail platform.

9. The method of claim 1, wherein the image is a photographic image of the first party.

10. The method of claim 1, wherein, in the pictorial notification, the image defines the link.

11. The method of claim 1, wherein the pictorial notification message comprises a markup document carrying the image in Multipart MIME (Multipurpose Internet Mail Extensions) format.

12. The method of claim 11, wherein sending the pictorial notification message comprises sending the pictorial notification message via Multimedia Messaging Service (MMS).

13. The method of claim 11, wherein sending the pictorial notification message comprises sending the pictorial notification message via Wireless Application Protocol (WAP) Push.

14. The method of claim 1, further comprising:
at the voice mail platform, generating the pictorial notification message in response to receiving the voice mail message from the first party for the second party.

15. A voice mail platform comprising:
data storage;
a processing unit;
message storage logic stored in the data storage and executable by the processing unit to receive and store voice mail messages left for parties; and
notification logic stored in the data storage and executable by the processing unit, (a) to receive in a first in a first session between a first party and the voice mail platform a voice mail message from the first party for a second party, (b) to receive in a second session between the first party and the voice mail platform, at the time of the first session, an image associated with the first party, and (c) to generate and send to the second party a pictorial notification message that includes (i) the received image and (ii) a link to the voice mail message, wherein invocation of the link causes the voice mail platform to play out the voice mail message.

16. The voice mail system of claim 15, wherein invocation of the link causes a third session to be initiated with the voice mail platform, in which the voice mail platform plays out the voice mail message and then offers one or more options for further interaction with the voice mail platform.

17. The voice mail system of claim 15, further comprising:
image data stored in the data storage data, the image data including (i) a plurality of digital images and (ii) correlation data correlating each of a plurality of parties respectively with a digital image of the plurality of digital images,
the voice mail platform being arranged to reference the correlation data so as to determine a digital image correlated with a calling party, for purposes of generating and sending a pictorial voice mail notification if the calling party does not provide digital image at the time of leaving a message.

* * * * *